(12) United States Patent
Bolisetti et al.

(10) Patent No.: US 11,640,659 B2
(45) Date of Patent: May 2, 2023

(54) SYSTEM AND METHOD FOR ASSESSING THE HEALTH OF AN ASSET

(71) Applicant: GENERAL ELECTRIC COMPANY, Schenectady, NY (US)

(72) Inventors: S V Raj Kumar Bolisetti, Bangalore (IN); Rajani M. Poornima, Bangalore (IN); Ashok Kumaraswamy, Bangalore (IN); Vishnu Tatiparthi, Bangalore (IN); Lakshmy Narayanan, Bangalore (IN); Vamshi Krishna Reddy Kommareddy, Bangalore (IN); Aditya Bhakta, Bangalore (IN); Raja Vardhan Movva, Bangalore (IN); Debasish Mishra, Bangalore (IN)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 17/149,377

(22) Filed: Jan. 14, 2021

(65) Prior Publication Data
US 2021/0217155 A1    Jul. 15, 2021

(30) Foreign Application Priority Data
Jan. 15, 2020 (IN) .............................. 202011001847

(51) Int. Cl.
*G06K 9/00* (2022.01)
*G06T 7/00* (2017.01)

(52) U.S. Cl.
CPC .... *G06T 7/001* (2013.01); *G06T 2207/10016* (2013.01); *G06T 2207/20081* (2013.01);
(Continued)

(58) Field of Classification Search
CPC ........... G06T 7/001; G06T 2207/10016; G06T 2207/20081; G06T 2207/20084;
(Continued)

(56) References Cited

U.S. PATENT DOCUMENTS 7,843,512 B2   11/2010   Mohamed
8,379,921 B1    2/2013   Golan
(Continued)

*Primary Examiner* — Samir A Ahmed
(74) *Attorney, Agent, or Firm* — Fitch, Even, Tabin & Flannery LLP

(57) ABSTRACT

There are provided methods and systems for assessing the health of an asset. For example, a system is provided. The system may include a processor and a memory including instructions that, when executed by the processor, cause the processor to perform operations consistent with identifying a defect in a component of an asset. The operations may include fetching from an inspection system, a plurality of images acquired from an inspection of the component of the asset by the inspection system. The operations may include identifying, based on an image processing technique codified and included as part of the instructions, a subset of images from the plurality of images. The subset of images is representative of the defect in the component of the asset, and the image processing technique is selected from the group consisting of an auto-distress ranking technique, a structural similarity technique, a mean-subtracted filtering technique, and a Hessian norm computation technique.

19 Claims, 5 Drawing Sheets

(52) U.S. Cl.
CPC ............... *G06T 2207/20084* (2013.01); *G06T 2207/30164* (2013.01)

(58) Field of Classification Search
CPC ......... G06T 2207/30164; G06T 7/0004; G06T 5/50; G06F 30/15; G06F 2119/02
See application file for complete search history.

(56) References Cited

U.S. PATENT DOCUMENTS

| | | |
|---|---|---|
| 8,744,166 B2 | 6/2014 | Scheid et al. |
| 8,761,451 B2 | 6/2014 | Bobbitt |
| 8,761,490 B2 | 6/2014 | Scheid |
| 8,781,209 B2 | 7/2014 | Scheid et al. |
| 8,781,210 B2 | 7/2014 | Scheid et al. |
| 8,792,705 B2 | 7/2014 | Scheid et al. |
| 8,934,545 B2 | 1/2015 | Bilobrov |
| 9,217,999 B2 | 12/2015 | Domke et al. |
| 9,251,582 B2 | 2/2016 | Lim et al. |
| 9,298,986 B2 | 3/2016 | Ferlatte |
| 9,361,524 B2 | 6/2016 | Ghanem |
| 9,471,057 B2 | 10/2016 | Scheid et al. |
| 9,646,652 B2 | 5/2017 | Adsumilli |
| 2004/0183900 A1 | 9/2004 | Karpen et al. |
| 2013/0114878 A1* | 5/2013 | Scheid ................. G06T 7/001 382/141 |
| 2014/0185912 A1* | 7/2014 | Lim ..................... G06T 7/001 382/141 |
| 2014/0195184 A1* | 7/2014 | Maeda ................ G01M 99/00 702/183 |
| 2014/0207403 A1 | 7/2014 | Messinger et al. |
| 2015/0125036 A1 | 5/2015 | Bilobrov |
| 2015/0346115 A1* | 12/2015 | Seibel .............. A61B 1/00096 348/50 |
| 2016/0070962 A1 | 3/2016 | Shetty |
| 2016/0196643 A1* | 7/2016 | Bendall ................ G06F 3/005 382/108 |
| 2017/0337705 A1* | 11/2017 | Bendall ................ G01B 11/24 |
| 2017/0358072 A1 | 12/2017 | Stancato et al. |
| 2019/0294883 A1 | 9/2019 | Pathak et al. |
| 2019/0304077 A1 | 10/2019 | Wang et al. |
| 2019/0339165 A1 | 11/2019 | Finn et al. |
| 2019/0340805 A1* | 11/2019 | Xiong ................ G06T 7/0004 |
| 2020/0160497 A1* | 5/2020 | Shah ..................... G06T 7/001 |

\* cited by examiner

400

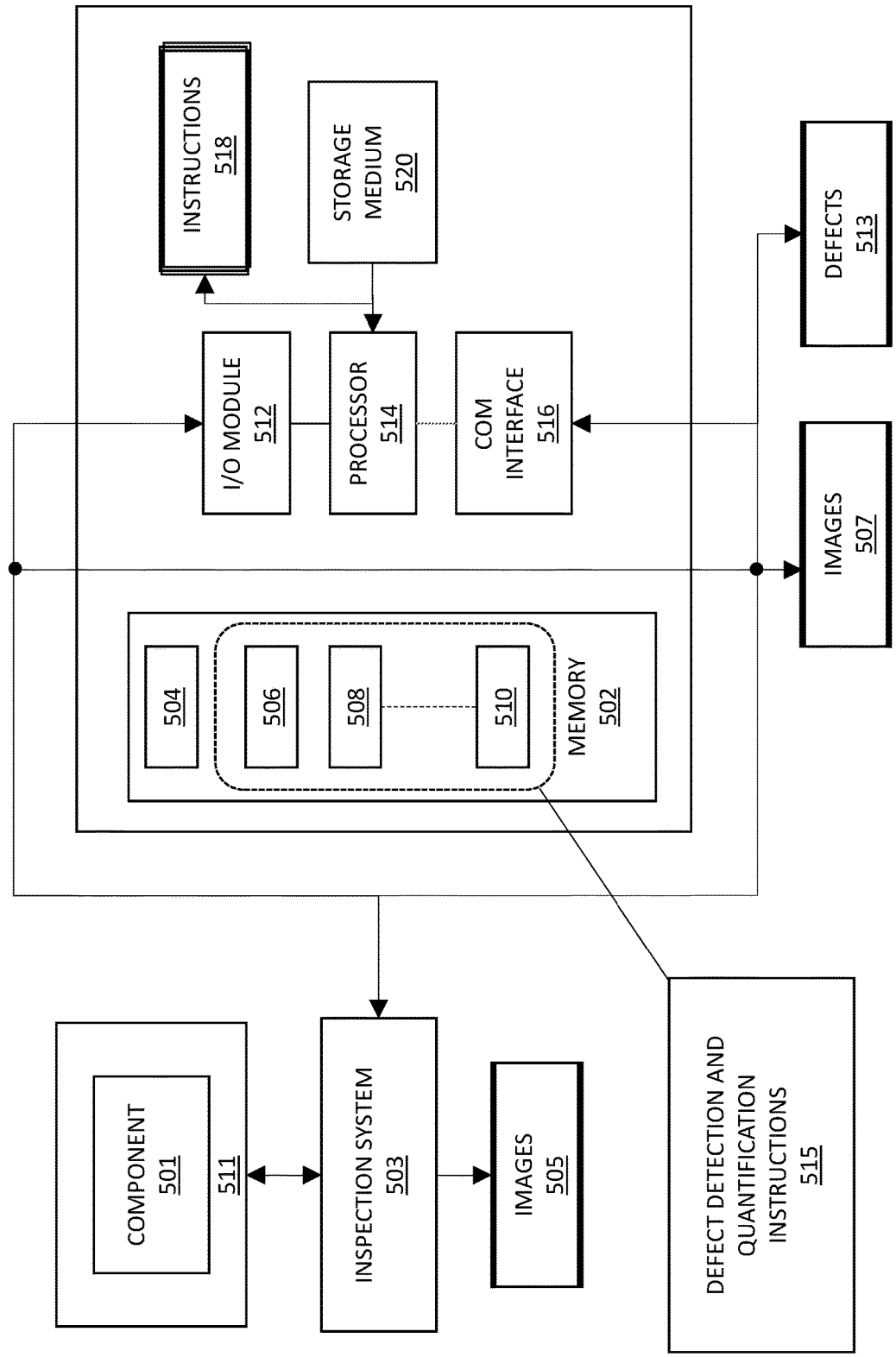

SYSTEM AND METHOD FOR ASSESSING THE HEALTH OF AN ASSET

CROSS-REFERENCE TO RELATED APPLICATION

This application claims the benefit of Indian Patent Application No. 202011001847, filed Jan. 15, 2020.

TECHNICAL FIELD

The present disclosure relates to inspection of assets. More particularly, the present disclosure relates to systems and methods for assessing the health or performance of an asset or of one or more of its sub-components.

BACKGROUND

In many industrial applications, routine inspections of assets can help in extending the lifetime of these assets as the inspections can reveal damaged parts that either need to be replaced or serviced. For example, in aviation applications, engines are routinely inspected in order to monitor their overall health and performance. When inspecting an engine, a borescope-based inspection (BSI) may be conducted to look at various engine sub-components; the BSI typically includes capturing a sequence of images, each image being a frame that can be analyzed to characterize one or more aspects of the sub-component depicted in the frame.

In one exemplary use case, a typical BSI system may capture a video with a probe inserted in the engine in order to reach a sub-component of interest; then, by trial and error, a highly trained operator of the BSI system may select a good view of the sub-component based on the video or a frame of the video. The operator may then move on to next sub-component by actuating the probe to another location within the engine. These typical steps in BSI methods result in the capture of many images, of which only a few show the best views of sub-component defects. Decisions about the condition of the sub-component are typically made by experts based on these selected few frames. As such, the quality of the inspection depends highly on being able to adequately locate these frames of interest out of many captured frames; this process is inherently difficult, and it depends subjectively on the technician's skills. Thus, current inspection methods are not-only inefficient but they can also be error-prone.

SUMMARY

The embodiments featured herein help solve or mitigate the above-noted issues as well as other issues known in the art. For example, in one embodiment there is provided a system for identifying a defect in a component of an asset. The system includes a processor and a memory including instructions that, when executed by the processor, cause the processor to perform operations consistent with identifying the defect. For instance, the operations may include fetching from an inspection system, a plurality of images acquired from an inspection of the component of the asset by the inspection system. The operations may include identifying, based on an image processing technique codified and included as part of the instructions, a subset of images from the plurality of images. The subset of images is representative of the defect in the component of the asset, and the image processing technique is selected from the group consisting of an auto-distress ranking technique, a structural similarity technique, a mean-subtracted filtering technique, and a Hessian norm computation technique.

In another embodiment, there is provided a method for identifying a defect in a component of an asset. The method includes fetching, by a defect-identification system, from an inspection system, a plurality of images acquired from an inspection of the component of the asset by the inspection system. The method further includes identifying, by the defect-identification system, based on an image processing technique, a subset of images from the plurality of images. The subset of images is representative of the defect in the component of the asset, and the image processing technique is selected from the group consisting of an auto-distress ranking technique, a structural similarity technique, a mean-subtracted filtering technique, and a Hessian norm computation technique.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 5 illustrates a system according to several aspects described herein.

DETAILED DESCRIPTION

Figure 1:
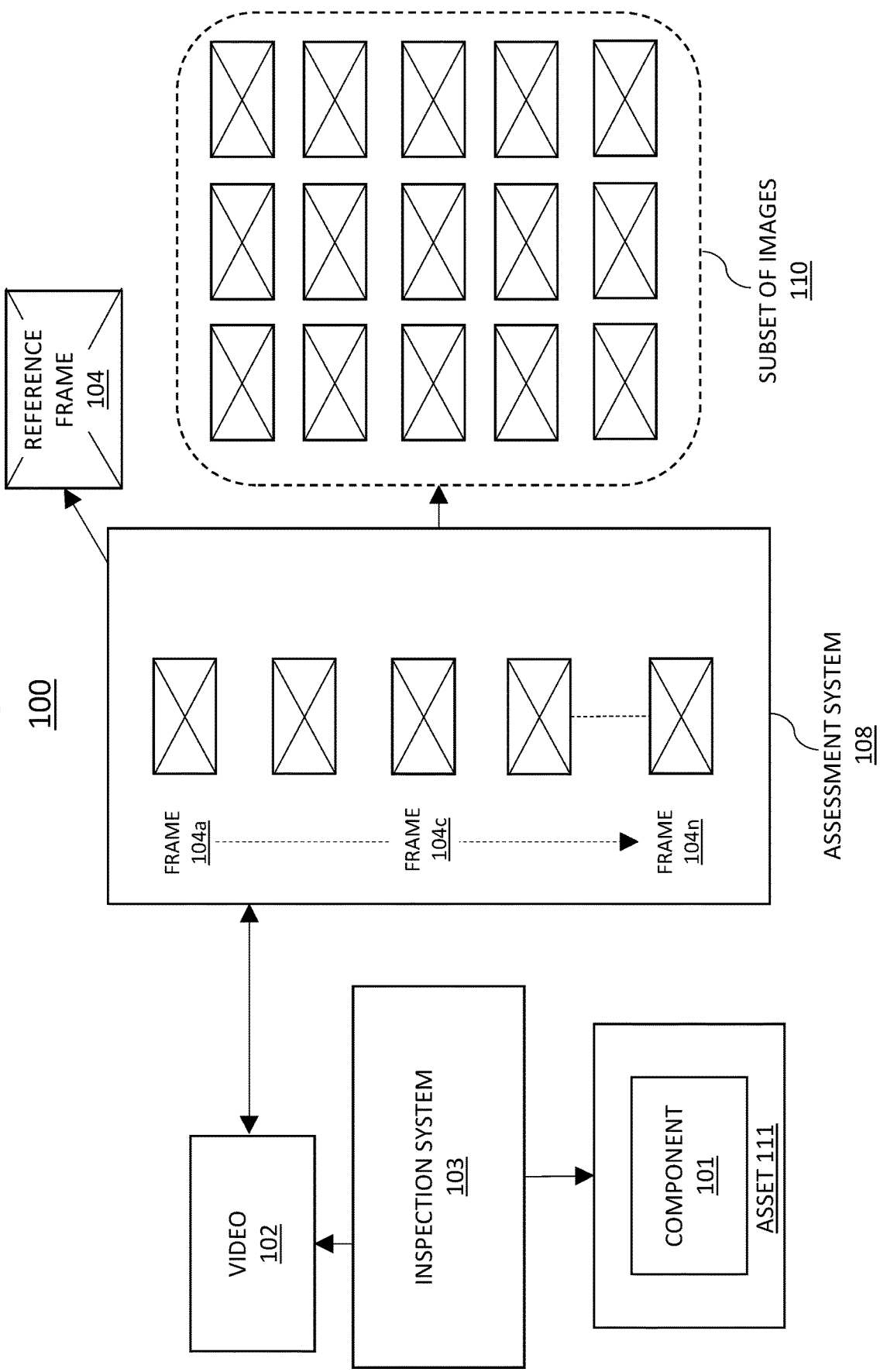
FIG. 1 illustrates a system according to several aspects described herein.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

For instance, one or more embodiments featured herein may be a system that automatically determine the best frames from a collection of frames acquired by an inspection system. In one embodiment, the best frames (e.g., one or more frame of interest) are identified by first pre-processing the sequence of images using a mean subtracted filter, and then monitoring the Hessian norm of the image information. The "best" frames may be selected based on one or more criteria, such as, for example, a result of the aforementioned one or more pre-processing operation. In another embodiment, an exemplary system can be configured to select frames from a video based on the maximum exposure of different components; the selection may be achieved using a structural similarity method or the like. As such, the embodiments remove subjectivity from the inspection process and thus provide consistency and accuracy.

In the exemplary embodiments, a distress ranking method is not needed for all the frames captured, and this makes the health assessment of an engine ~100 times faster than the typical inspection methods, in addition to improving the accuracy of the inspection. The embodiments also provide a training dataset for distress ranking algorithms, should an operator decide to use such algorithms in assessing engine health and performance. As such, the embodiments can reduce training time in addition to increasing reliability.

The embodiments confer several advantages. For example, one or more embodiments described herein may automatically estimate the extent of defects registered during an inspection. Furthermore, the embodiments may automatically provide additional informative statistics about the defects, thus providing means for a continuous-time and/or continuous-valued defect metric. The embodiment thus help re-define ranking procedures, and thus, they reduce the error in current processes, which cannot be discretized with a ranking in steps of <1 (continuous).

The embodiments also allow the tracking of distress progression, and they thus help in forecasting part replacements and optimizing scheduled maintenance cycles or the on-time delivery of assets. Furthermore, the embodiments allow continuous distress ranking methods (DRM) to be performed, and when combined with operational parameters, the embodiments can help in establishing distress trends and forecasting.

Additionally, in one or more exemplary embodiments, acquired images can be rendered on to a computer-aided design (CAD) model to enable an inspector to assess the actual distress relative to the as-designed (or as-manufactured) sub-component being examined. In the alternative, an exemplary system can be configured to use the composite images (i.e., the images rendered onto the CAD model) to automatically (i.e., without user intervention) assess the actual distress relative to the as-designed or as-manufactured sub-component being examined.

Generally, the embodiments include smart and on-the-fly component health monitoring systems that combine programmable inspection hardware in conjunction with embedded image processing techniques to characterize part failure and automatically provide recommendations considering historical and physics-based observations. Further, Generally, the embodiments help reduce the time required for engine assessment, and they improve the reliability of an assessment. Furthermore, the embodiments help enhance the reliability of auto-distress ranking algorithms, and they also help reduce the time required to prepare datasets for training auto-distress ranking algorithms.

The embodiments include an on-the fly recommendation system that enables component distress ranking through seamless integration of advanced data acquisition, analytics techniques and physics-based considerations. They can permit key frame extraction that provide engineers with new and reduced but accurate datasets that can be used to build more efficient analytics based on engine health. They embodiments also provide a standardized and consistent images that can be stored for later use. The embodiments also provide improved predictive models as a result of the built-in quantification of the number of connected regions and the distribution of defect areas. The embodiments also permit the automatic unification of design, operating and maintenance data with image analytics and physics-based data, resulting in enhanced predictive analytics. The latter feature reduces the cumbersome manual effort of typical inspection procedures, by leveraging and customizing deep learning methods for analytics.

The embodiments allow the real-time streaming of the image acquisition, which leads to fast, scalable, efficient and lightweight image or video processing. This enables a wide variety of down-stream analytics to performed, yielding improved component assessments. Generally, the embodiment's performance, and thus the quality of an inspection, is not dependent on skill and knowledge of the inspection engineer.

Exemplary embodiments can also be configured to identify a key frame of interest based on at least five steps. For example, summarized information of every frame (e.g., a Hamming norm) may be used to make a decision. Additional information may be provided using a structural similarity method, which is independent of absolute pixel values and works using internal dependencies of the pixel values. Such an approach is not sensitive to the component external structural changes like cracks, discoloration etc.

The embodiments can also help quantify defects. This is achieved by an algorithm that measures the pixels marked as defects by an identification machine learning model. Different statistics measures like the number of connected regions, the distribution of these, and the largest affected region may be provided to improve downstream analytics.

In addition to the aforementioned technical points of novelty and technical advantages, the embodiments also have several commercial advantages, which address currently unmet needs in the industry. For example, the embodiments provide speedier inspections, thereby avoiding spending more time to find the best view of a component in a video acquired through inspection. This will reduce misses of defects that are due to operator oversight, which could be detrimental as further damages could incur if a faulty component is missed during inspection. Thus, the embodiments decrease repair costs and improve the time-on-wing of aircraft engines.

The embodiments may make use of image recognition algorithms such as a pattern recognition algorithms, and a frame may be determined as being of interest if a specific condition is met while processing the images using the algorithms. For example, such a criterion may be the mean square error (MSE). Generally, however, an exemplary method or system may independent of absolute pixel values and may work using internal dependencies of the pixel values because pixel dependencies carry important information about the structure of the objects in the visual scene. In the embodiments, CNNs may be used as a deep learning technique to directly train deep neural networks that can quantify the damage of the component directly instead of achieving component assessment in two steps (detection and quantification).

Having described the characteristics and several advantages of the embodiments in general terms, an exemplary embodiment is now discussed in regards to FIG. 1. The exemplary system 100 depicted in FIG. 1 includes a plurality of components and subsystems that are configured to perform an inspection of an asset 111 and detect one or more defects of a component 101 of the asset 111, without user intervention. The system 100 includes an assessment system 108, which is configured to determine from a video 102 (or a collection of images 104a, 104c, and 104n), a reference frame 104 (or image). The inspection system 103 may be, for example and not by limitation, a borescope inspection system.

The inspection system 103 is configured to acquire the video 102 via a probe that is inserted in the asset 111, specifically to inspect the component 101. In one exemplary use case, the probe may be actuated such that the video 102 includes several views of the component 101 and/or several views of a plurality of components like the component 101. The inspection system 103 may further be configured to provide the reference frame 104, which may be, a set of frames representative of known-to-be defect-free portion of the component 101. For example, the reference frame 104 may have been saved in a memory of the inspection system 103 at a time when the asset 111 or the component 101 was first commissioned, or it may be an image of a similar component that is in pristine condition.

The system 100 further includes an assessment system 108 that is configured to fetch the video 102 and the reference frame 104 from the inspection system 103. The assessment system 108 is further configured to determine from the collection of images (i.e., frames) from the video 102 to select key frames of interest, i.e., a subset of images 110 that each correspond to a defect of the component 101. A defect may be, herein, a deformation ensued from prolonged use, a crack, or any other non-ideal structural changes that may increase the risk of the component 101 failing during the operation of the asset 111.

The operation and various aspects of the system 100 are described herein after in terms of the inspection of one or more aviation-related components. As construed herein, a video is a sequence of images (i.e. frames) and the quality of the information that can be ascertained from the sequence of images depends on may factors. For example, for a borescope video of aviation engines, some of the factors may be, non-exhaustively, the handling of the camera, lighting conditions, the accessibility to the component of interest, the angle of capture, the location of capture, specific movements of the proves, as well as the camera specifications. The system 100 is configured to identify key frames of interest, in spite of these factors that may yield to a poor quality of the video 102.

As a non-limiting example, the system 100 is described in the context of an inspection of one or more blades of an engine. In a typical inspection, a probe of the inspection system 103 is introduced into the engine through the borescope port near the blades and held in place at a convenient location. The blade set is then externally rotated slowly (usually manually) so that the blades rotate around their axis. What is captured in the video is a blade coming into focus from the background, partly visible initially, then slowly coming completely into focus and then moving out of visibility, as the next blade comes into view. So, there is a location/time where there is maximum visibility of the blade. The latter situation is capable of yielding the best view for a blade to be properly determined.

Figure 2:
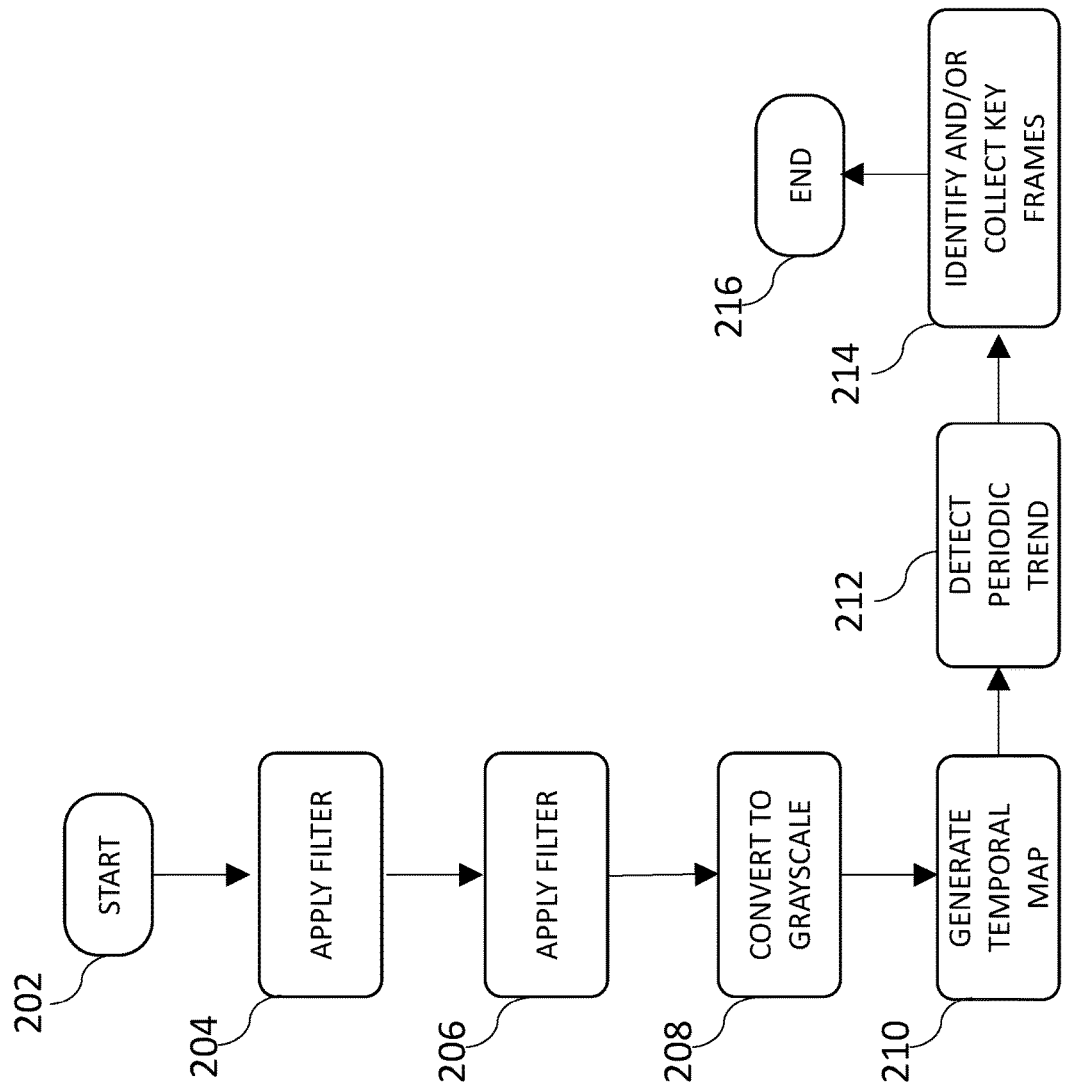
FIG. 2 illustrates a method according to several aspects described herein.

The system 100 is configured to identify these key frames that correspond to the best views of the blades, out of all the frames captured by the borescope. This identification is carried out according to an exemplary method 200 that can be executed by the assessment system 108, as follows. The exemplary method 200, as shown in in FIG. 2. The method 200 begins at step 202 and features a step 204 that includes applying a mean subtraction filter on each frame to normalize the lighting/illumination of the component (i.e., in this example, a blade that is in the field of view of the borescope's camera). Other filters like a gaussian smoothening can also be used in conjunction or in lieu of the mean subtraction filter.

The method 200 features a step 206 that includes converting each frame acquired (or each frame under investigation) to grayscale, to further normalize across all sequence of frames that are being analyzed. The method 200 further includes generating a measure that summarizes the information for each of the frame (step 208). For example, and not by limitation, a Hamming norm may be used to summarize the information for a particular the statistic. The method 200 further includes (at step 210) generating a temporal map between the summarized information and the set of frames that are examined. In one embodiment, the assessment system 108 is configured to determine whether the temporal map exhibits a periodic trend, like, for example and not by limitation, a sinusoid. The method 200 includes identifying and/or collecting all frames corresponding to a maximum position in the detected periodic trend (step 212). The frames corresponding to these maxima are to the frames which have most of the image showing the blade. In other words, frames corresponding to the maximum value of every period of the sequential Hamming norm are the key frames required. These are frames with the maximum desired information. Likewise, the frames corresponding to the minimum value of every period have less information about the blade, but more information about the background, which in some embodiments may also be of inspection value. The method 200 can then include issuing the collected frames (step 214) and ending at step 216.

In another embodiment, the assessment system 108 may be configured to overcome the problem of identifying frames with maximum exposure based on a structural similarity method. In this embodiment, the structural similarity method is independent of absolute pixel values and works using internal dependencies of the pixel values, hence the assessment system 108 is able to identify frames with maximum exposure of different components and is not sensitive to the component external structural changes like cracks, discoloration etc. In this method, spatially close pixels in the images will have strong internal dependencies and hence carry important information about the structure of the objects in the visual scene. The exemplary method 200 may thus include threshold tuning based on the video quality to filter the right frames and internal threshold tuning to avoid flagging multiple frames of same component.

In yet another embodiment, the system 100 is configured to quantify the defect that have been detected on a component in a manner that will improve current damage analytic models. For instance, a machine learning algorithm for defect identification may be used on an input image to mark defect areas. In the above-mentioned example of the blade inspection, a key frame detected by the assessment system 108 and then processed via a defect detection module of the assessment system 108 that marks out the pixels in the original image which correspond to defects in the blade.

Figure 3:
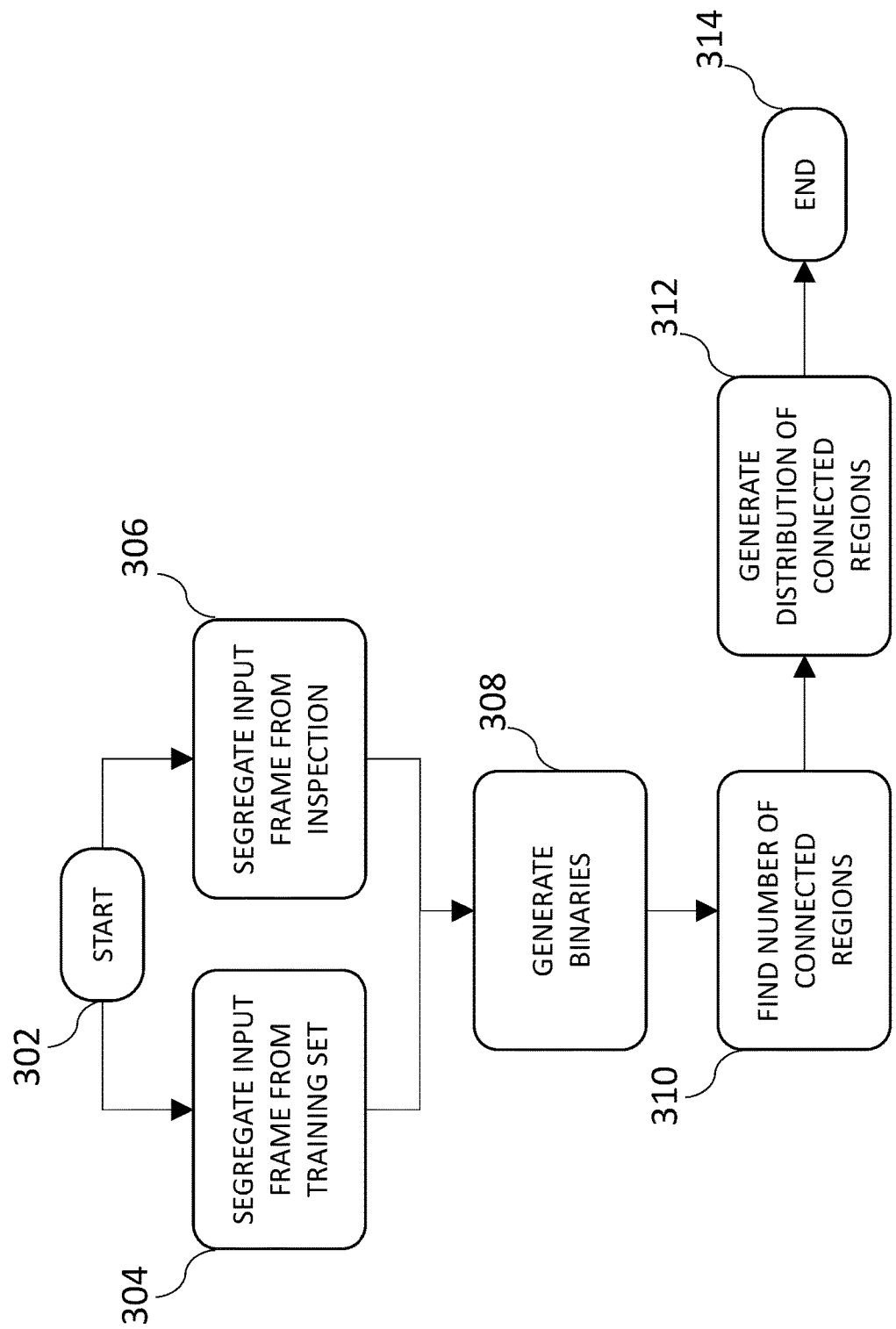
FIG. 3 illustrates a method according to several aspects described herein.

For example, these defects are from a pretrained set of spallation, oxidation, cracking, material removal or others. The assessment system 108 uses this set as an input to conduct a method 300 (FIG. 3) to quantify these defects. The method 300 begins at step 302 and includes segregating the input to a binary image corresponding to every defect mode of interest (step 304) from a training set. The method 300 further includes performing the same segregation from every frame acquired from the inspection (step 306). In the binary image, an area that is a defect is a pixel with value +1, and unaffected area is a pixel with value 0 (step 308). It is noted that such an assignment of the binary values to areas of defect and no-defect is by convention and thus not limiting.

The method 300 includes finding the number of connected regions (310). A connected region is a collection of pixels which have a value +1 and which are touching each other, such that within a connected region one can traverse from any starting pixel to any other pixel in the region without skipping any pixel. There can be any number of such connected regions depending on the component and the defect. The method 300 then provides the distribution of the area of the connected regions for every defect in every image (312). The method 300 also provides the cumulative sum of these connected regions. These then are used to better represent the condition of the component in the engine. A difference in the distribution between different blades, for example, indicates a different health level of each blade. As such the method 300 helps improves analytic models that are used to predict life, servicing or removal of a component, as defects can be quantified and thus categorized utilizing the exemplary method 300 and the system 100. The method 300 then ends at step 314.

Figure 4:
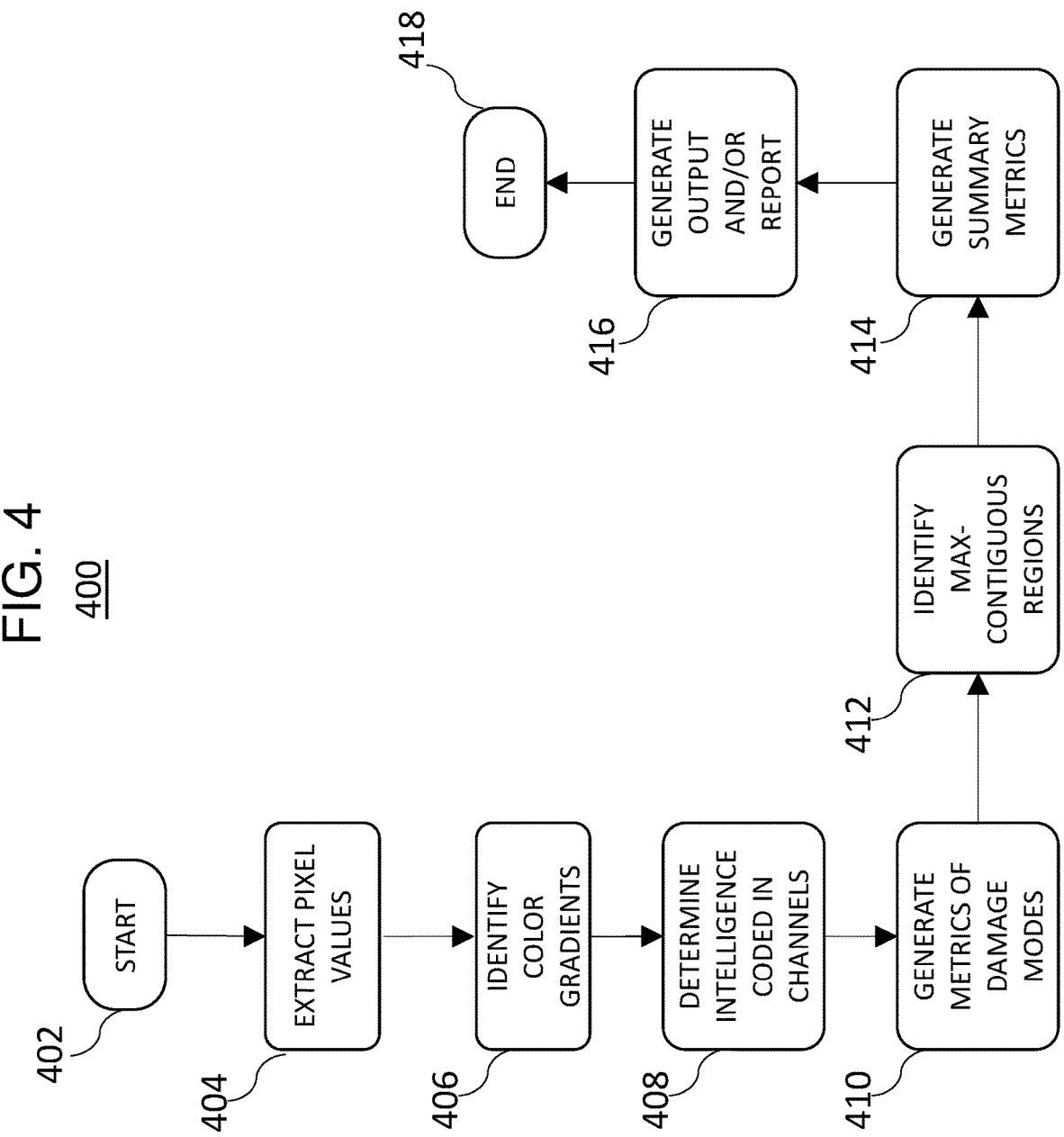
FIG. 4 illustrates a method according to several aspects described herein.

In yet another embodiment, the system 100 may be configured to execute a method 400 (FIG. 4). The method 400 includes annotated (marked areas which denotes detected damage areas in visual image or frames) damage modes in a visual form, either as in the images or video frames formats. The method 400 includes may make use of image processing techniques to determine a set features including, but not limited to: part damage extent (area or length), nature (specific to damage mode: example: expanding vs localized), geometrical attributes such as shape, texture (smooth or abrasive or patterned or granular), form (continuous or wavy), color (gradient variations and patterns in shades), orientation with respect to image edges, and a severity metric defined for each of the damage modes.

Generally, the method 400 includes providing annotations to the visual inputs that help categorize, i.e. distinguish, each of the aforementioned damage modes. These annotated features of the image or frames are processed at the pixel level to extract relevant metrics of each of the damage mode mentioned above. Specifically, the method 400 begins at step 402 and includes extracting specific channel pixel values (e.g., RGB), thus performing a channel split (step 404). The method 400 further includes identify, based on pixel values for example, color gradients across the image or frame area (step 406).

The method 400 further includes ascertaining the intelligence coded in the channels as heuristics that pertains to specific damage modes in terms of segmenting or isolating regions that matches with heuristic conditions (step 408). These may include: crop, mask, smoothen, add noise, blend, geometric transformations or convolutions. The method 400 then includes (step 410) generating, from the above identified regions, metrics of damage modes such as shape, form, geometric attributes, texture, and color, for example. In addition to the above operations, to quantify the extent of damage, the method 400 can include using operations such as max-contiguous region identification of large isolated regions within an image (step 412). The method 400 further includes summarizing, using the information of these individual max-contiguous regions identified for each image as, metrics including total Pixel area, percentage of area, max-contiguous pixel area (step 414). These metrics provide zone-wise (location) and component information based on specific criteria. The method 400 further includes generating a set of rules and a knowledge repository database module that maintains necessary information for different components and damage modes and input requirements. The method 400 further includes generating one or more reports or outputs for each of the damage mode and a location within a frame or image with quantification information consistent with the above-mentioned metrics (step 416), and the method 400 ends at step 418. The format of the one or more outputs or reports may be in a specified format that is compliant with down-stream systems (e.g., analytics, diagnostics, safety, operations, maintenance planning).

FIG. 5 illustrates a system 500 according to an exemplary embodiment. The system 500 may be configured to implement one or more of the methods for defect-identification described above. The system 500 includes an application-specific processor 514 configured to perform tasks specific to assessing the health and/or performance of an asset. The processor 514 has a specific structure imparted by instructions stored in a memory 502 and/or by instructions 518 that can be fetched by the processor 514 from a storage medium 520. The storage medium 520 may be co-located with the processor 514, or it may be located elsewhere and be communicatively coupled to the processor 514 via a communication interface 516.

The system 500 can be a stand-alone programmable system, or it can be a programmable module located in a much larger system, which itself may be centralized or distributed across various locations or computing infrastructure, the latter being for example, a cloud-based computing infrastructure. The processor 514 may include one or more hardware and/or software components configured to fetch, decode, execute, store, analyze, distribute, evaluate, and/or categorize information. Furthermore, the processor 514 can include an input/output module (I/O module 512) that can be configured to ingest data pertaining to single assets or fleets of assets. The processor 514 may include one or more processing devices or cores (not shown). In some embodiments, the processor 514 may be a plurality of processors, each having either one or more cores. The processor 514 can be configured to execute instructions fetched from the memory 502, i.e. from one of memory block 504, memory block 506, memory block 508, and memory block 510.

Without loss of generality, the storage 520 and/or the memory 502 may include a volatile or non-volatile, magnetic, semiconductor, tape, optical, removable, non-removable, read-only, random-access, or any type of non-transitory computer-readable computer medium. The storage medium 520 may be configured to log data processed, recorded, or collected during the operation of the processor 514. The data may be time-stamped, location-stamped, cataloged, indexed, or organized in a variety of ways consistent with data storage practice. The storage 520 and/or the memory 502 may include programs and/or other information that may be used by the processor 514 to perform tasks consistent with the processes and/or methods described herein.

For example, and not by limitation, the processor 514 may be configured by instructions from the memory block 506, the memory block 508, and the memory block 510, to perform operations resulting in either the identification of a subset of images 507 representative of one or more defects 513 from a component 501 of an asset 511. The processor 514 may execute the aforementioned image processing instructions 515 from memory blocks 506, 508, and 510, which would cause the processor 514 to perform certain operations associated with monitoring the health and/or performance of a component of an engine. The operations may include fetching from an inspection system 500, a plurality of images 505 acquired from an inspection of a component 501 of the asset 511 by the inspection system 503. The operations may include identifying, based on an image processing technique codified and included as part of the instructions in the memory blocks 506, 508, and 510, a subset of images 507 from the plurality of images 505. The subset of images 507 is representative of a defect in the component 501 of the asset 511. The image processing technique is selected from the group consisting of an auto-distress ranking technique, a structural similarity technique, a mean-subtracted filtering technique, and a Hessian norm computation technique.

It is noted that while the embodiments have been described in the context of aviation applications and with BSI methods, they can be used in a wide variety of industrial applications where inspections are performed and not necessarily with BSI. As such, those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for identifying a defect in a component of an asset, the system comprising:
   a processor;
   a memory including instructions that, when executed by the processor, cause the processor to perform operations comprising:
      fetching from an inspection system, a plurality of images acquired from an inspection of the component of the asset by the inspection system;
      identifying, based on an image processing technique codified and included as part of the instructions, a subset of images from the plurality of images, wherein the image processing technique includes utilizing a Hamming norm to obtain summarized information of each of the plurality of images, and the subset of images is identified by using the summarized information from the Hamming norm,
      wherein the subset of images is representative of the defect in the component of the asset, and
      wherein the image processing technique is selected from the group consisting of an auto-distress ranking technique, a structural similarity technique, a mean-subtracted filtering technique, and a Hessian norm computation technique.

2. The system of claim 1, wherein the operations further include fetching a CAD model of the component and rendering a specified image from the subset of images onto the CAD model.

3. The system of claim 2, wherein the operations further include fetching the CAD model from a database communicatively coupled to the system.

4. The system of claim 2, wherein the operations further include identifying one or more regions of the specified image representative of the defect.

5. The system of claim 1, wherein the asset is an engine.

6. The system of claim 1, wherein the inspection system includes a borescope inspection system.

7. The system of claim 1, wherein the operations further include extracting the plurality of images from a video.

8. The system of claim 1, wherein the plurality of images include several views of the component.

9. The system of claim 1, wherein the operations further include providing a metric associated with the defect based on a specified image form the subset of images.

10. The system of claim 9, wherein the metric is independent of an absolute pixel value of a specified image from the subset of images.

11. The system of claim 9, wherein the metric is based on summarized information from a specified image from the subset of images.

12. The system of claim 1, wherein the operations further include providing a dataset including metrics generated from the subset of images based on the image processing technique.

13. The system of claim 12, wherein the operations further include training a neural network or a deep learning system based on the dataset.

14. The system of claim 13, wherein the operations further include providing another a second dataset based on a result of the training, the other second dataset being representative of a predictive performance of the component.

15. A method for identifying a defect in a component of an asset, the method comprising:
   fetching, by a defect-identification system, from an inspection system, a plurality of images acquired from an inspection of the component of the asset by the inspection system;
   identifying, by the defect-identification system, based on an image processing technique, a subset of images from the plurality of images, wherein the image processing technique includes utilizing a Hamming norm to obtain summarized information of each of the plurality of images, and the subset of images is identified by using the summarized information from the Hamming norm,
   wherein the subset of images is representative of the defect in the component of the asset, and
   wherein the image processing technique is selected from the group consisting of an auto-distress ranking technique, a structural similarity technique, a mean-subtracted filtering technique, and a Hessian norm computation technique.

16. The method of claim 15, further including fetching a CAD model of the component and rendering a specified image from the subset of images onto the CAD model.

17. The method of claim 16, further including fetching the CAD model from a database communicatively coupled to the system.

18. The method of claim 15, further including extracting the plurality of images from a video.

19. The method of claim 15, further including providing a metric associated with the defect based on a specified image of the subset of images.

* * * * *

UNITED STATES PATENT AND TRADEMARK OFFICE
CERTIFICATE OF CORRECTION

| | |
|---|---|
| PATENT NO. | : 11,640,659 B2 |
| APPLICATION NO. | : 17/149377 |
| DATED | : May 2, 2023 |
| INVENTOR(S) | : Bolisetti et al. |

It is certified that error appears in the above-identified patent and that said Letters Patent is hereby corrected as shown below:

In the Claims

In Column 10, Claim 9, Line 9, delete "form" and insert -- from --, therefor.

Signed and Sealed this
First Day of August, 2023

*Katherine Kelly Vidal*

Katherine Kelly Vidal
*Director of the United States Patent and Trademark Office*